June 30, 1964  R. R. DINAMARQUE  3,139,234
RIGHT-ANGLED TRIANGLE AS AN AUXILIARY CALCULATING DEVICE
Filed June 13, 1961  2 Sheets-Sheet 1

June 30, 1964 R. R. DINAMARQUE 3,139,234
RIGHT-ANGLED TRIANGLE AS AN AUXILIARY CALCULATING DEVICE
Filed June 13, 1961 2 Sheets-Sheet 2

United States Patent Office 3,139,234
Patented June 30, 1964

3,139,234
RIGHT-ANGLED TRIANGLE AS AN AUXILIARY CALCULATING DEVICE
Remigio Reyes Dinamarque, Corrientes 1393, Buenos Aires, Argentina
Filed June 13, 1961, Ser. No. 116,740
4 Claims. (Cl. 235—61)

This invention relates to a novel right-angled triangle to be used as an auxiliary device in calculations which, besides its trigonometric functions, may also be utilized in linear drawing and as such auxiliary device in calculations solves problems which up till now have not been solved.

At present triangles are being used that are simply graduated in millimetres or fractions of the same, but their angles as well as their sides do not meet any other requirements apart from the already known ones.

Trigonometry has shown that a triangle, when the value of one of its acute angles has been determined, may be supplemented by graduated devices in order to establish exactly the measurement of segments the purpose of which will be explained in the following description.

The invention consists essentially in that with the present triangle utilized as an auxiliary device in calculations it is possible to calculate mentally and by approximation, either in more or in less, by means of a direct calculation, the measurement of the following segments. For instance, given the diameter of a circle it is possible to obtain the square root of the surface of the circle, i.e. the measure of the side of the square with the desired degree of approximation; and given the same diameter it is possible to obtain the cube root of the volume of the sphere, i.e. the measure of the edge of the cube, also with the desired degree of approximation.

By way of description of a simple embodiment of the invention it will be shown that the values of the angles making up the triangle are natural values of trigonometric functions and as in trigonometry the values of the functions are constant for each angle it is possible to determine by means of the same the square root and the cube root given the diameter of the circle or sphere, or inversely if desired, given the side of the square or the edge of the cube it is possible to determine the measure of the diameter of the circle or sphere, respectively.

According to this invention the present triangle has been devised and tested with excellent results as follows: the hypotenuse 4 of the triangle 1 is provided with a metric or decimal scale 5 arranged parallel to said hypotenuse 4, which is utilized to determine the diameter of a circle or sphere. On the major leg of said triangle 1, indicated at 2, another metric or decimal scale 6 is arranged parallel to said major leg 2, which is utilized to find the cube root by which the volume of the sphere is rectified. And adjacent to said scale 6 a third metric or decimal scale 7 is arranged in a divergent angle relative to scales 5 and 6 in ascending order, which is utilized to rectify the surface of the circle; also, with the same square root obtained it is possible to rectify the surface of the sphere, given the diameter. Related to said scales an indicator 8 is arranged, guidably moving parallel to hypotenuse 4 and provided with a suitable guiding means carrying a transparent window 9 showing simultaneously three values, said window being provided with two lines forming a V whose vertex 10 reaches the diameter-indicating scale 5; the left line or arm 11 passes over scale 6 parallel to the divisions of said scale 6; and the right line or arm 12 passes over scale 7 parallel to the divisions of said scale. Thus while the vertex 10 faces scale 5 indicating the measure of the diameter of a circle, the left line 11 indicates on scale 6 the cube root of the volume of the sphere and at the same time the right line 12 indicates on scale 7 the square root of the surface of said circle, the values having to conform in all cases to the respective functions mentioned hereinafter.

By way of example and illustrating an embodiment of the invention:

FIG. 1 of the accompanying drawing is a top plan view of the present triangle showing the arrangement of the different parts and their operation.

Figure 1:
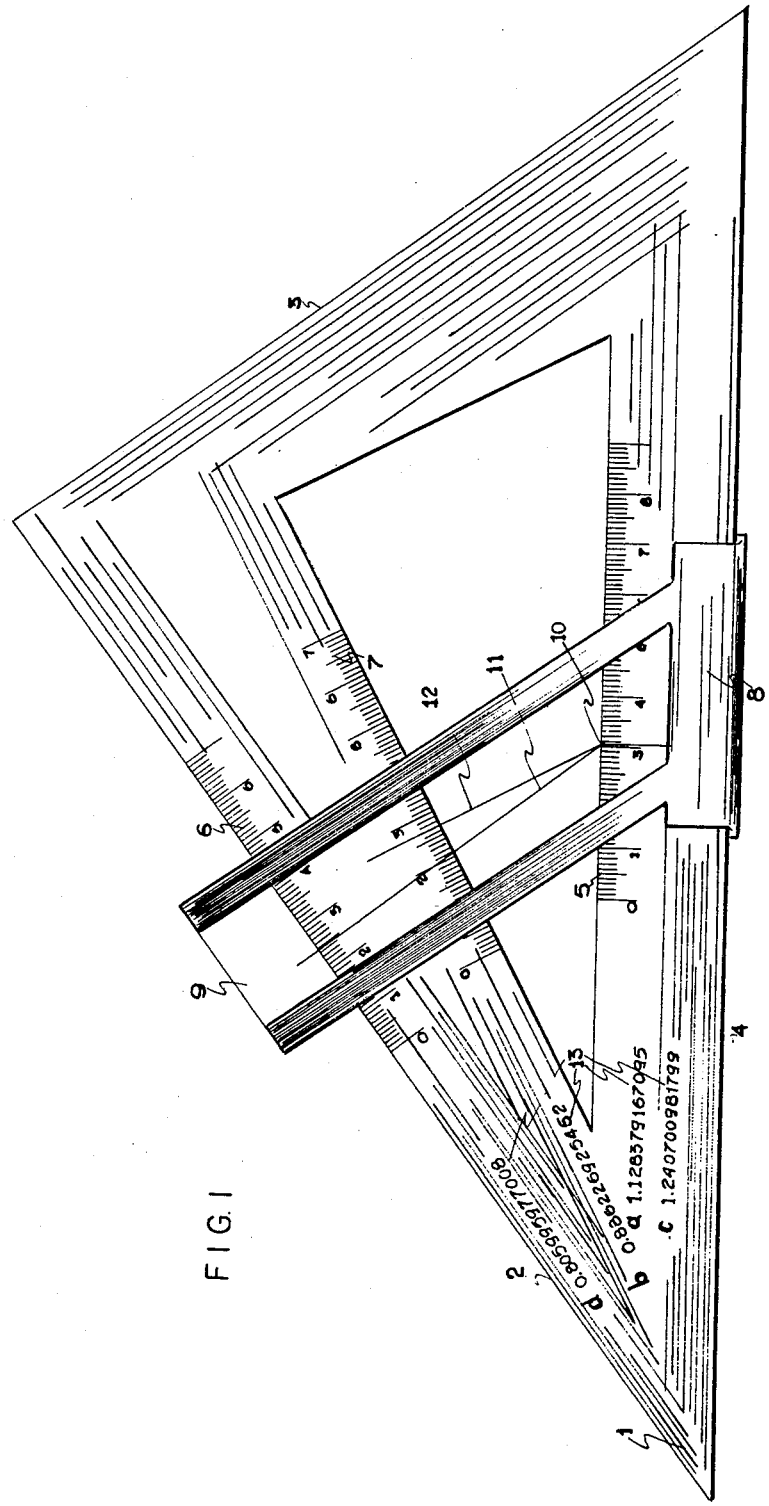

According to FIG. 1 the triangle is constituted by the following parts or principal members:

A member of solid material, preferably transparent, 1 and forming a right-angled triangle with a major leg 2, a minor leg 3 and the hypotenuse 4.

A metric or decimal scale 5 arranged or traced on the body of the triangle proper, situated parallel to hypotenuse 4.

Another metric or decimal scale 6 arranged or traced on the body of said triangle 1, situated parallel to the major leg 2.

A third metric or decimal scale 7 arranged or traced on the body of said triangle, situated at a divergent angle relative to the other two scales 5 and 6 in ascending order of the scales, this third scale being utilized to rectify the surface of a circle.

An indicator 8 slidably moving parallel to the hypotenuse 4, provided with a transparent window 9 having two hair-lines forming a V whose vertex 10 is located at the diameter-indicating scale 5 and whose lines or arms 11 and 12 co-operate with the scales 6 and 7 at the corresponding dividing lines arranged perpendicularly to said scales.

The values 13 of the functions which in order to save time in carrying out the calculations may also be marked on the body of the triangle in any suitable order, in this instance as follows:

Value of $a=1.1283791670955125738$ (the reciprocal of $b$)

Value of $b=0.8862269254527580126$ (the reciprocal of $a$)

Value of $c=1.240700981799$ (the reciprocal of $d$)

Value of $d=0.805995977008$ (the reciprocal of $c$)

If the vertex 10 of the hair lines 11 and 12 on the scale 5 which is the scale for both $a$ and $c$, hair line 11 that extends to scale $d$ is set at the mark that corresponds, referring to scale $c$, to the diameter of a sphere (in, for instance, centimeters), the reading of scale $d$ (scale 6) using hair line 11 gives the length of the side of a cube of the same volume. Conversely, if the volume to be contained (say, in a spherical storage tank) is known, it is simple to determine the size of a cube of that volume. The scale $d$ (6) is then used, and setting the hair line 11 to the setting on scale $d$ that corresponds numerically to the length of the side of the cube of the desired volume (the decimal point, of course, may be moved) the vertex 10 of the hair lines will give a direct reading of the diameter of the corresponding sphere (the decimal point to be located to the position corresponding to its position used with respect to scale $d$). Since the scales $a$, $b$, $c$ and $d$ (5, 7, 5, 6) are in centimeters or decimal inches, the triangle of the present invention may be used both as an aid in drawing straight lines and as a scale, and the reading of the answers to the problems from scales $a$, $b$, $c$ or $d$ can be used directly in connection with the drawing being made.

Similarly, if the vertex 10 at the point of scale $c$ (which is, of course, the same scale as scale $a$) corresponding to the diameter of a circle, the reading on scale $b$ where hair line 12 crosses it will give the length of the side of a square of an area equal to that of the circle.

Figure 2:
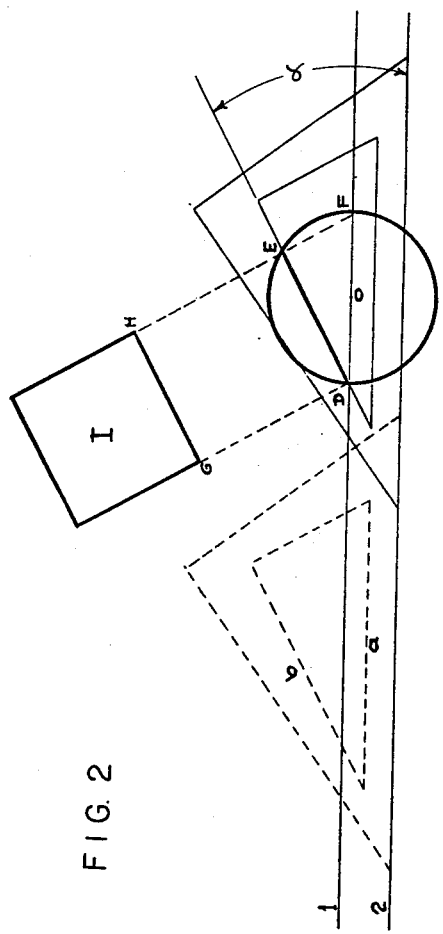
FIG. 2 is a diagram illustrating the geometry of the device with relation to circles and squares.

The side of a square that is of the same area as a circle is the same proportionate length compared to the diameter of the circle, regardless of the size. The proportionability is linear, and the rate of change of the one with respect to the other may be expressed as a sloping line. The slope of this line is such that the included angle $\alpha$ (see FIG. 2) is such that if the diameter of a circle D, F is the hypotenuse of a right angle D, E, F, and the length of the side of the square G, H is made the base D, E of the triangle D, E, F to form the other leg of angle $\alpha$, then the cosine of angle $\alpha$ is 0.8862269254527580126 and the secant of angle $\alpha$ is 1.1283791670955125738.

Figure 3:
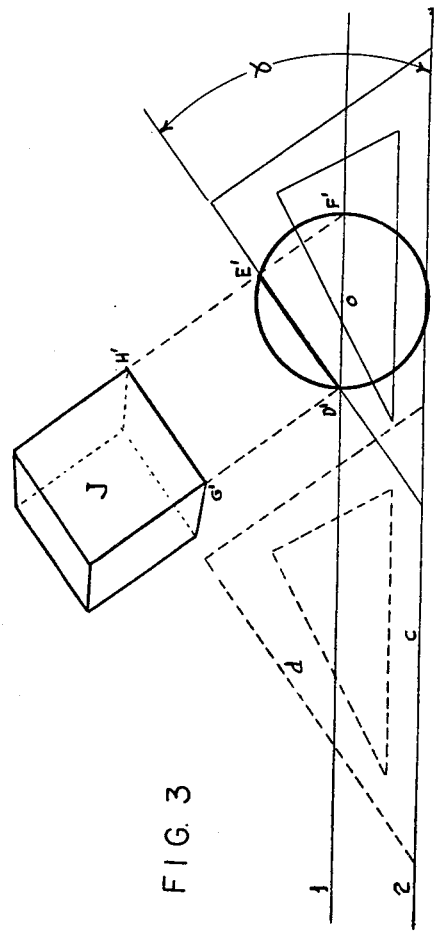
FIG. 3 is a diagram illustrating the geometry of the device in relation to spheres and cubes.

Also, the diameter of a sphere of a given volume varies linearly with respect to the length of the side G', H' of a cube of equal volume. Taking the diameter D', F' of the sphere as the hypotenuse of a triangle D', E', F' (see FIG. 3) and the line D', E' along which length of the side of the cube is to be measured as the base of the triangle D', E', F', then the included angle $\gamma$ defines the linear motion between the sphere and the cube and the slope of this line D', E' with respect to line D', F' will be expressed as the cos $\gamma = 0.805995977008$ and sec $\gamma = 1.240700981799$.

Since the length of the side of the square and the diameter of the circle are in proportion to each other, it makes no difference which of the two is known, the other may be determined as the proportions are expressible as the cos $\alpha$ or the sec $\alpha$ depending on which length is known, and may be read directly from scale $b$ or $a$.

Similarly, if either the diameter of a sphere or the length of the side of the cube is known, the other dimension (side of cube or diameter of sphere) may be determined as the proportionality may be expressed as cos $\gamma = 0.805995977008$ or sec $\gamma = 1.240700981799$, and may be read directly from scale $d$ or $c$.

Since $$\cos = \frac{1}{\sec} \text{ and } \sec = \frac{1}{\cos}$$

it is clear that the values of the scales $a$ and $b$ are reciprocal. That is, the hair line 12 being always the opposite side to angle $\alpha$, the two sides adjacent the angle $\alpha$ are in proportion to each other by the trigonometric function of cos $\alpha$ or sec $\alpha$, but since $$\frac{1}{\cos} = \sec \text{ and } \frac{1}{\sec} = \cos$$

it may be truly said that the numerical values on each scale for any setting is the reciprocal of the numerical value of the other.

Similarly, the numerical values or the diameter of sphere scale $c$ is the reciprocal of the numerical value of the length of the side of the cube scale $d$.

Thus supposing we have a diameter of, say, 2 meters the vertex 10 of indicator 8 will indicate 20 millimetres on scale 5; on scale 7 at line 12 we shall have about 1.77 metres corresponding to the first three figures of the square root of the surface, pertaining to the diameter in question. Should the observed answer to the calculation not prove satisfactory the direct calculation may be resorted to, using the value of function $b$; and keeping the vertex of the indicator in the same position the cube root of the volume of the sphere is read simultaneously, given the same diameter, as about 1.61 corresponding to the first three figures of the cube root. Should the observed answer to the calculation be unsatisfactory recourse may be had to the direct calculation using the value of function $d$.

This means to say that the present triangle simplifies calculations to a great extent thus saving considerable time in carrying out the operations.

It will be appreciated that in the practice of this invention any materials considered most suitable may be employed and structural details may be modified without departing from the scope of the invention.

What I claim is:

1. A triangle for use as an auxiliary calculating device comprising a plane triangular member of solid material, a first side of which is provided with a decimal scale arranged parallel thereto, the adjacent second side of said triangle being provided with a similar second decimal scale arranged parallel to said second side, and a third similar decimal scale adjacent said second scale but at a divergent angle relative to said first and second scales, the apex of said divergent angle being at the apex of said adjacent first and second sides, said scales increasing numerically from said end of said scales adjacent the apex of said angle extending from zero in ascending order in the same direction along said scales, a transparent indicator slidably arranged to move parallel to said first scale, said indicator being provided with first and second hair-lines extending in a V form from a common point movable along said first scale, each said hair-line extending from said first scale to a corresponding one of said second and third scales, said scales being so placed that when the bottom of said V rests on zero of said first scale the hair-lines each lie on zero of its corresponding scale.

2. A triangular auxiliary calculating device according to claim 1, in which said scales are metric scales whereby they may also be used as measures of length.

3. A triangular auxiliary calculating device according to claim 1, in which said hair-lines lie obliquely to said first scale and normal to the length of the corresponding second and third scales, respectively.

4. A triangular auxiliary calculating device according to claim 1, in which the body of said triangle is provided with numerals showing the values of the corresponding functions, and in which the values of said second and third scales are reciprocals of the values of said first scale.

References Cited in the file of this patent

UNITED STATES PATENTS

| | | |
|---|---|---|
| 1,730,852 | Jenny | Oct. 8, 1929 |
| 1,969,296 | De Valle Arizpe | Aug. 7, 1934 |

FOREIGN PATENTS

| | | |
|---|---|---|
| 1,703 | Great Britain | May 10, 1873 |
| 112,416 | Great Britain | Feb. 28, 1918 |